United States Patent
Hayashi et al.

(10) Patent No.: US 9,421,858 B2
(45) Date of Patent: Aug. 23, 2016

(54) DRIVE CONTROL DEVICE FOR HYBRID VEHICLE

(75) Inventors: Koji Hayashi, Aichi-gun (JP); Masato Terashima, Toyota (JP); Hiroyasu Harada, Toyota (JP); Tomohito Ono, Gotenba (JP); Hiroyuki Ishii, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 242 days.

(21) Appl. No.: 14/364,549

(22) PCT Filed: Dec. 12, 2011

(86) PCT No.: PCT/JP2011/078731
§ 371 (c)(1),
(2), (4) Date: Jun. 11, 2014

(87) PCT Pub. No.: WO2013/088501
PCT Pub. Date: Jun. 20, 2013

(65) Prior Publication Data
US 2014/0342865 A1  Nov. 20, 2014

(51) Int. Cl.
*B60W 10/02* (2006.01)
*B60K 6/50* (2007.10)
(Continued)

(52) U.S. Cl.
CPC . *B60K 6/50* (2013.01); *B60K 6/365* (2013.01); *B60K 6/387* (2013.01); *B60K 6/445* (2013.01); *B60W 10/02* (2013.01); *B60W 10/10* (2013.01);
(Continued)

(58) Field of Classification Search
CPC ............................. B60W 10/02; B60W 20/40
See application file for complete search history.

(56) References Cited

U.S. PATENT DOCUMENTS 5,876,306 A * 3/1999 Murata ........................... 477/97
8,066,609 B2 11/2011 Kersting
(Continued)

FOREIGN PATENT DOCUMENTS

AU 2011373822 A1 2/2014
JP 2005-199942 7/2005
(Continued)

*Primary Examiner* — Derek D Knight
(74) *Attorney, Agent, or Firm* — Sughrue Mion, PLLC

(57) ABSTRACT

A drive control device for a hybrid vehicle is provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element, and a third rotary element, one of the second rotary element and the third rotary element being connected to the third rotary element of said first differential mechanism; a clutch configured to selectively couple the second rotary element of said first differential mechanism, and the other of the second and third rotary elements of said second differential mechanism which is not connected to the third rotary element of said first differential mechanism, to each other; and a brake configured to selectively couple said other of the second and third rotary elements of said second differential mechanism which is not connected to the third rotary element of said first differential mechanism, to a stationary member, the drive control device comprises: a resonance point change control portion configured to switch an operating state of at least one of said clutch and said brake when a resonance of a power transmitting system in said hybrid vehicle has been detected or forecasted.

1 Claim, 12 Drawing Sheets

(51) Int. Cl.
*B60K 6/365* (2007.10)
*B60K 6/387* (2007.10)
*B60K 6/445* (2007.10)
*B60W 10/10* (2012.01)
*B60W 10/12* (2012.01)
*B60W 20/00* (2016.01)
*B60W 30/20* (2006.01)
*B60K 6/38* (2007.10)
*B60W 30/194* (2012.01)

(52) U.S. Cl.
CPC ............... *B60W 10/12* (2013.01); *B60W 20/00* (2013.01); *B60W 20/10* (2013.01); *B60W 20/20* (2013.01); *B60W 20/40* (2013.01); *B60W 30/20* (2013.01); *B60K 2006/381* (2013.01); *B60W 30/194* (2013.01); *B60W 2030/206* (2013.01); *B60W 2510/0676* (2013.01); *Y02T 10/6239* (2013.01); *Y10S 903/902* (2013.01)

(56) References Cited

U.S. PATENT DOCUMENTS

| | | |
|---|---|---|
| 2007/0202987 A1 | 8/2007 | Kakinami et al. |
| 2010/0286883 A1 | 11/2010 | Kato et al. |
| 2011/0111906 A1 | 5/2011 | Kim et al. |

FOREIGN PATENT DOCUMENTS

| | | |
|---|---|---|
| JP | 2006-152877 A | 6/2006 |
| JP | 2007-232069 A | 9/2007 |
| JP | 2008-265600 A | 11/2008 |
| JP | 2009-179205 A | 8/2009 |
| JP | 2011-098712 A | 5/2011 |
| WO | 2013/014777 A1 | 1/2013 |

\* cited by examiner

|  | BK | CL | MODE |
|---|---|---|---|
| EV-1 | ○ |  | 1 |
| EV-2 | ○ | ○ | 2 |
| HV-1 | ○ |  | 3 |
| HV-2 |  | ○ | 4 |
| HV-3 |  |  | 5 |

FIG.11
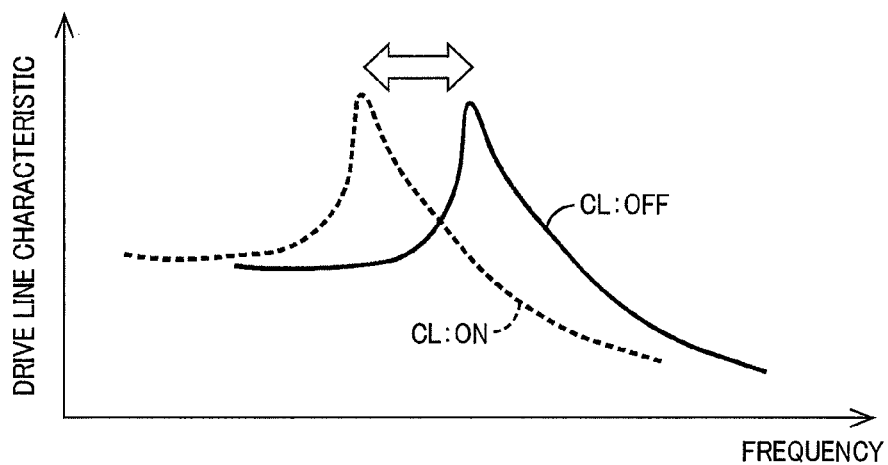
FIG.12
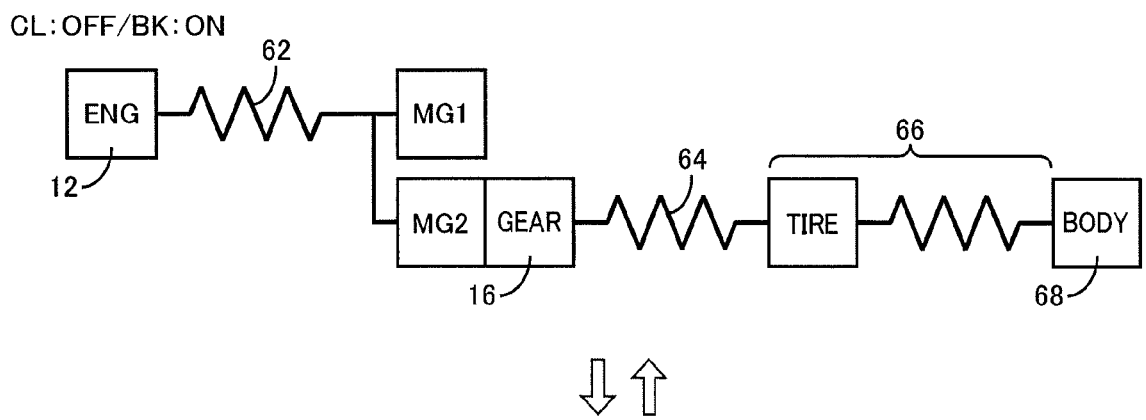
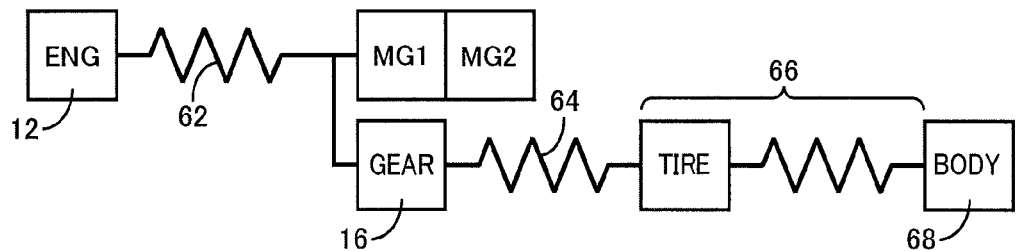

DRIVE CONTROL DEVICE FOR HYBRID VEHICLE

TECHNICAL FIELD

The present invention relates to a drive control device for a hybrid vehicle, and more particularly to an improvement for reducing vibrations of a power transmitting system.

BACKGROUND ART

There is known a hybrid vehicle which has at least one electric motor in addition to an engine such as an internal combustion engine, which functions as a vehicle drive power source. Patent Document 1 discloses an example of such a hybrid vehicle, which is provided with an internal combustion engine, a first electric motor and a second electric motor. This hybrid vehicle is further provided with a brake which is configured to fix an output shaft of the above-described internal combustion engine to a stationary member, and an operating state of which is controlled according to a running condition of the hybrid vehicle, so as to improve energy efficiency of the hybrid vehicle and to permit the hybrid vehicle to run according to a requirement by an operator of the hybrid vehicle.

PRIOR ART DOCUMENT

Patent Document

Patent Document 1: JP-2008-265600 A1

SUMMARY OF THE INVENTION

Object Achieved by the Invention

According to the conventional arrangement of the hybrid vehicle described above, however, an input torque received by the power transmitting system from a wavy roadway surface on which the hybrid vehicle is running is boosted, and an amplitude of vibrations of the power transmitting system is increased, when the frequency of the input torque (input torque pulsation) is coincident with the resonance frequency of the power transmitting system, or when the frequency of a rotary motion pulsation of the engine during starting of the engine is coincident with the resonance frequency of the above-indicated power transmitting system. This problem was first discovered by the present inventors in the process of intensive studies in an attempt to improve the performance of the hybrid vehicle.

The present invention was made in view of the background art described above. It is therefore an object of the present invention to provide a drive control device for a hybrid vehicle, which permits reduction of vibrations of a power transmitting system of the hybrid vehicle.

Means for Achieving the Object

The object indicated above is achieved according to a first aspect of the present invention, which provides a drive control device for a hybrid vehicle, which is provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element, and a third rotary element, one of the second rotary element and the third rotary element being connected to the third rotary element of the above-described first differential mechanism; a clutch configured to selectively couple the second rotary element of the above-described first differential mechanism, and the other of the second and third rotary elements of the above-described second differential mechanism which is not connected to the third rotary element of the above-described first differential mechanism, to each other; and a brake configured to selectively couple the above-indicated other of the second and third rotary elements of the above-described second differential mechanism which is not connected to the third rotary element of the above-described first differential mechanism, to a stationary member, the control device being characterized in that an operating state of at least one of the above-described clutch and the above-described brake is switched when a resonance of a power transmitting system in the above-described hybrid vehicle has been detected or forecasted.

Advantages of the Invention

According to the first aspect of the invention described above, there are provided: the first differential mechanism having the first rotary element connected to the first electric motor, the second rotary element connected to the engine, and the third rotary element connected to the output rotary member; the second differential mechanism having the first rotary element connected to the second electric motor, the second rotary element, and the third rotary element, one of the second rotary element and the third rotary element being connected to the third rotary element of the above-described first differential mechanism; the clutch configured to selectively couple the second rotary element of the above-described first differential mechanism, and the other of the second and third rotary elements of the above-described second differential mechanism which is not connected to the third rotary element of the above-described first differential mechanism, to each other; and the brake configured to selectively couple the above-indicated other of the second and third rotary elements of the above-described second differential mechanism which is not connected to the third rotary element of the above-described first differential mechanism, to the stationary member. The operating state of at least one of the above-indicated clutch and brake is switched when the resonance of the power transmitting system in the above-described hybrid vehicle has been detected or forecasted. Thus, in the event of detection or forecasting of the resonance of the power transmitting system, the resonance point of the power transmitting system is changed by changing the inertia balance of the power transmitting system, so that the generation of a resonance can be adequately prevented. Namely, the present embodiment provides the drive control device for the hybrid vehicle, which permits reduction of vibrations of the power transmitting system of the hybrid vehicle.

According to a second aspect of the invention, the drive control device according to the above-described first aspect of the invention is configured to switch the operating state of the at least one of the above-described clutch and brake when a presently selected position of a manually operable shifting device in the above-described hybrid vehicle is a parking position while a temperature of the above-described power transmitting system of the above-described hybrid vehicle is equal to or lower than a predetermined threshold value. Preferably, the temperature of the above-described power transmitting system corresponds to a temperature of water or oil concerning the engine, or a temperature of a battery connected to the first or second electric motor. According to this second aspect of the invention, the generation of a resonance of the power transmitting system can be detected or forecasted in a practical manner, and can be adequately prevented.

According to a third aspect of the invention, the drive control device according to the above-described first aspect of the invention is configured to switch the operating state of the at least one of the above-described clutch and brake when an input of a pulsation to the above-described power transmitting system has been detected or forecasted on the basis of a running speed of the hybrid vehicle and an operating speed of the above-described engine and a predetermined relation. According to this third aspect of the invention, the generation of a resonance of the power transmitting system can be detected or forecasted in a practical manner, and can be adequately prevented.

BRIEF DESCRIPTION OF THE DRAWINGS

FIG. 11 is a view for explaining different characteristics of the power transmitting system (resonance frequency characteristics) in the drive system of FIG. 1, which correspond to the respective different operating states of the clutch;

FIG. 12 is a view schematically illustrating different resonance frequency values of the power transmitting system in the drive system of FIG. 1, which correspond to respective different combinations of the operating states of the clutch and brake;

MODE FOR CARRYING OUT THE INVENTION

Figure 1:
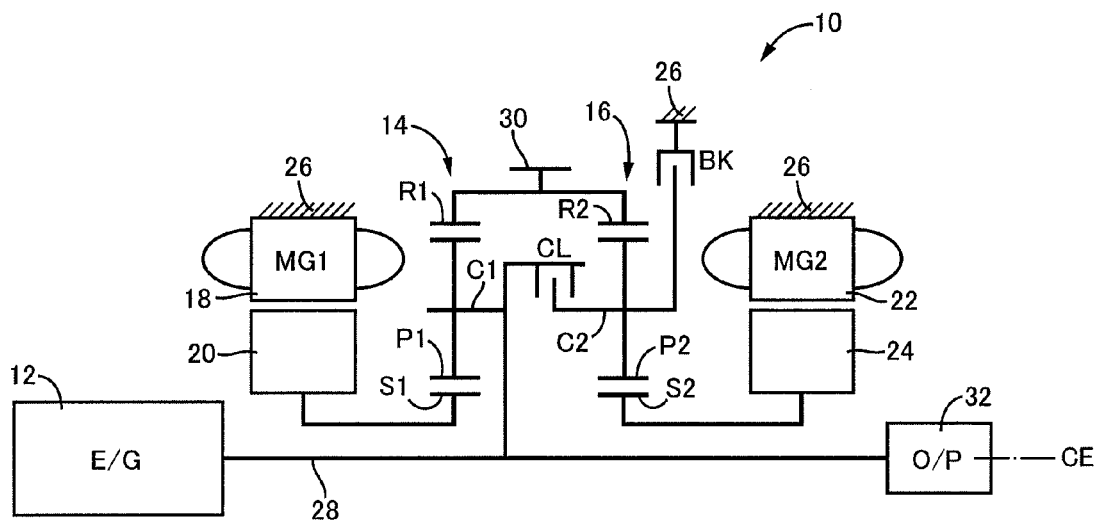
FIG. 1 is a schematic view for explaining an arrangement of a hybrid vehicle drive system to which the present invention is suitably applicable.

In one preferred form of the present invention, the above-described clutch and brake are hydraulically operated coupling devices the operating states (engaged and released states) of which are controlled according to a hydraulic pressure. While wet multiple-disc type frictional coupling devices are preferably used as the clutch and brake, meshing type coupling devices, namely, so-called dog clutches (claw clutches) may also be used. Alternatively, the clutch and brake may be electromagnetic clutches, magnetic powder clutches and any other clutches the operating states of which are controlled (which are engaged and released) according to electric commands.

The drive system to which the present invention is applicable is placed in a selected one of a plurality of drive modes, depending upon the operating states of the above-described clutch and brake. Preferably, EV drive modes in which at least one of the above-described first and second electric motors is used as a vehicle drive power source include a mode 1 to be established in the engaged state of the brake and in the released state of the clutch, and a mode 2 to be established in the engaged states of both of the clutch and brake. Further, hybrid drive modes in which the above-described engine is operated while the above-described first and second electric motors are operated to generate a vehicle drive force and/or an electric energy when needed, include a mode 3 to be established in the engaged state of the brake and in the released state of the clutch, a mode 4 to be established in the released state of the brake and the engaged state of the clutch, and a mode 5 to be established in the released states of both of the brake and clutch.

In another preferred form of the invention, the rotary elements of the above-described first differential mechanism, and the rotary elements of the above-described second differential mechanism are arranged as seen in the collinear charts, in the engaged state of the above-described clutch and in the released state of the above-described brake, in the order of the first rotary element of the first differential mechanism, the first rotary element of the second differential mechanism, the second rotary element of the first differential mechanism, the second rotary element of the second differential mechanism, the third rotary element of the first differential mechanism, and the third rotary element of the second differential mechanism, where the rotating speeds of the second rotary elements and the third rotary elements of the first and second differential mechanisms are indicated in mutually overlapping states in the collinear charts.

Referring to the drawings, preferred embodiments of the present invention will be described in detail. It is to be understood that the drawings referred to below do not necessarily accurately represent ratios of dimensions of various elements.

First Embodiment

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which is provided with rotary elements (elements) consisting of: a first rotary element in the form of a sun gear S1; a second rotary element in the form of a carrier C1 supporting a pinion gear P1 such the pinion gear P1 is rotatable about its axis and the axis of the planetary gear set; and a third rotary element in the form of a ring gear R1 meshing with the sun gear S1 through the pinion gear P1. The second planetary gear set 16 is a single-pinion type planetary gear set which has a gear ratio ρ2 and which is provided with rotary elements (elements) consisting of: a first rotary element in the form of a sun gear S2; a second rotary element in the form of a carrier C2 supporting a pinion gear P2 such the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels not shown through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is driven by electric energy can be installed in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
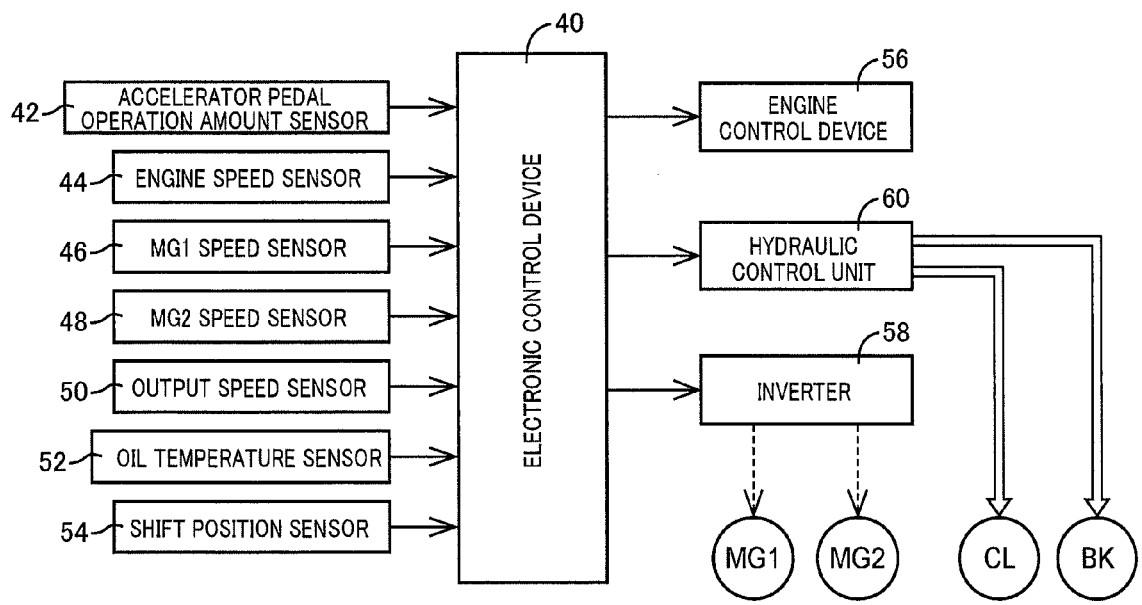
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: an output signal of an accelerator pedal operation amount sensor 42 indicative of an operation amount or angle $A_{CC}$ of an accelerator pedal not shown, which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of an oil temperature sensor 52 indicative of an oil temperature $T_{OIL}$, that is, a temperature of a working oil to be supplied to various portions of the drive system 10; and an output signal of a shift position sensor 54 indicative of a presently selected operating position $P_S$ of a manually operable shifting device not shown.

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and M2 are supplied to and stored in the battery through the inverter 58. Further, the electronic control device 40 applies command signals for controlling operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of a drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
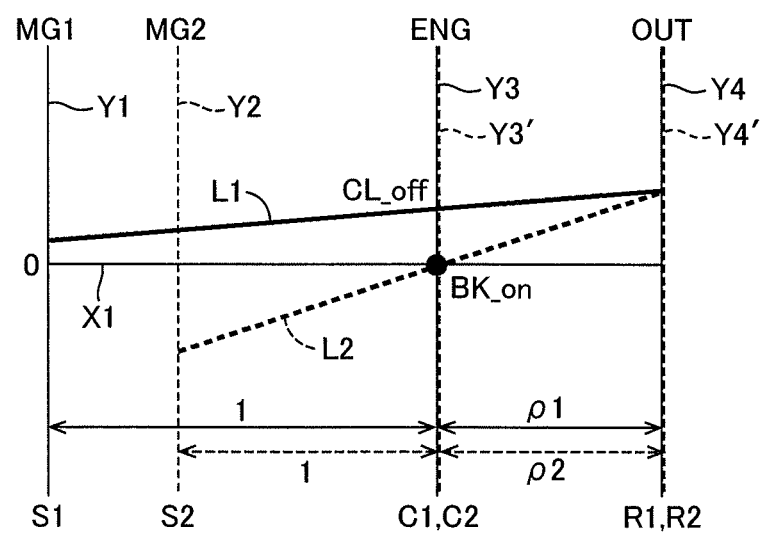
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; a mode 4 (drive mode 4) in the form of the drive mode HV-2 which is established in the released state of the brake BK and in the engaged state of the clutch CL; and a mode 5 (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicated the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios ρ1 and ρ2 of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "ρ1". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "ρ2". In the drive system 10, the gear ratio ρ2 of the second planetary gear set 16 is higher than the gear ratio ρ1 of the first planetary gear set 14 (ρ2>ρ1). The drive modes of the drive system 10 will be described by reference to FIGS. 4-7.

The drive mode EV-1 indicated in FIG. 3 corresponds to the mode 1 (drive mode 1) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the carriers C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the carrier C2 is fixed to the stationary member.

Figure 5:
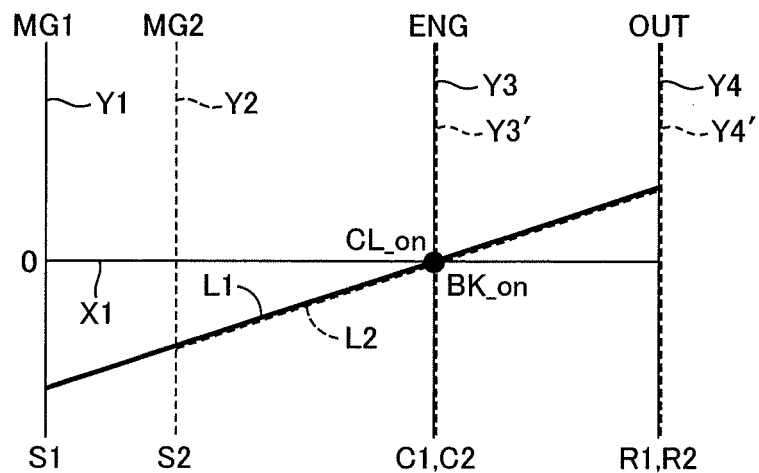
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (drive mode 2) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 is driven in the forward direction when the negative torque is generated by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the mode 2 is an EV drive mode which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (drive mode 3) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
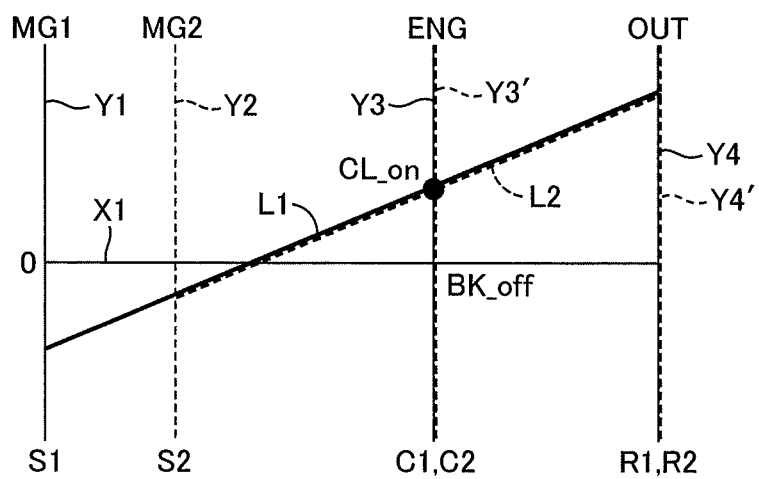
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (drive mode 4) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios ρ1 and ρ2 of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios ρ1 and ρ2. Accordingly, the drive system 10 is configured such that the gear ratio ρ2 of the second planetary gear set 16 is higher than the gear ratio ρ1 of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can generate a reaction force corresponding to the output of the engine 12. Namely, one or both of the first and second electric motors MG1 and MG2 can be operated to generate a reaction force or reaction forces during an operation of the engine 12, at an operating point assuring a relatively high degree of operating efficiency, and/or with a reduced degree of torque limitation due to heat generation.

For example, one of the first electric motor MG1 and second electric motor MG2 which is operable with a higher degree of operating efficiency is preferentially operated to generate a reaction force, so that the overall operating efficiency can be improved. When the hybrid vehicle is driven at a comparatively high running speed V and at a comparatively low engine speed $N_E$, for instance, the operating speed $N_{MG1}$ of the first electric motor MG1 may have a negative value, that is, the first electric motor MG1 may be operated in the negative direction. In the case where the first electric motor MG1 generates the reaction force acting on the engine 12, the first electric motor MG1 is operated in the negative direction so as to generate a negative torque with consumption of an electric energy, giving rise to a risk of reduction of the operating efficiency. In this respect, it will be apparent from FIG. 6 that in the drive system 10, the operating speed of the second electric motor MG2 indicated on the vertical line Y2 is less likely to have a negative value than the operating speed of the above-indicted first electric motor MG1 indicated on the vertical line Y1, and the second electric motor MG2 may possibly be operated in the positive direction, during generation of the reaction force. Accordingly, it is possible to improve the operating efficiency to improve the fuel economy, by preferentially controlling the second electric motor MG2 so as to generate the reaction force, while the operating speed of the first electric motor MG1 has a negative value. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 8:
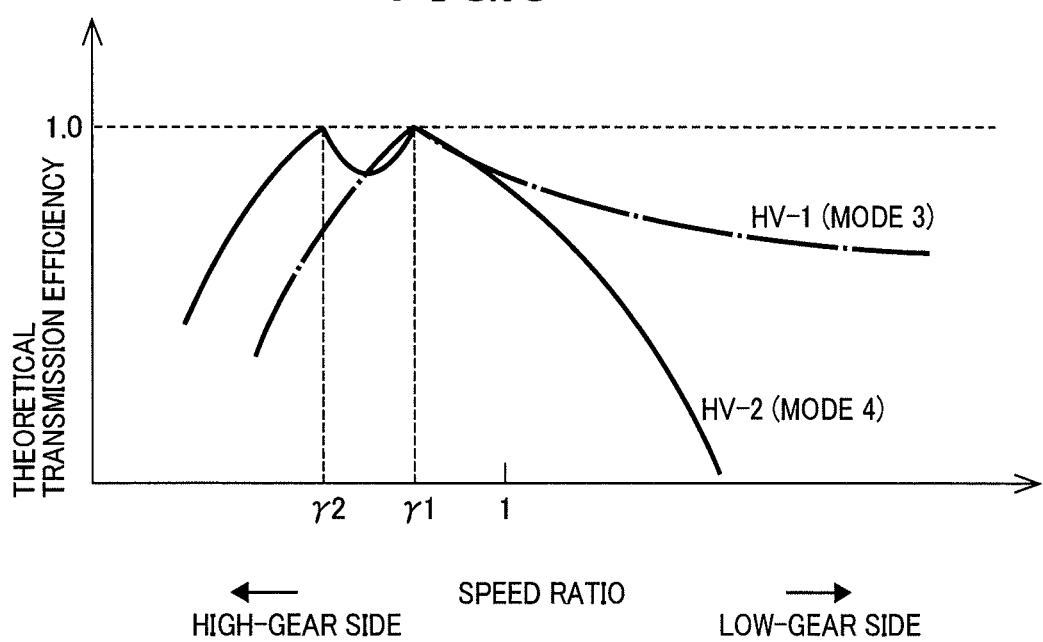
FIG. 8 is a view for explaining transmission efficiency of the drive system of FIG. 1.

FIG. 8 is the view for explaining transmission efficiency of the drive system 10, wherein the speed ratio is taken along the horizontal axis while theoretical transmission efficiency is taken along the vertical axis. The speed ratio indicated in FIG. 8 is a ratio of the input side speed of the first planetary gear set 14 and second planetary gear set 16 to the output side speed, that is, the speed reduction ratio, which is for example, a ratio of the rotating speed of the input rotary member in the form of the carrier C1 to the rotating speed of the output gear 30 (ring gears R1 and R2). The speed ratio is taken along the horizontal axis in FIG. 8 such that the left side as seen in the view of FIG. 8 is a side of high gear positions having comparatively low speed ratio values while the right side is a side of low gear positions having comparatively high speed ratio values. Theoretical transmission efficiency indicated in FIG. 8 is a theoretical value of the transmission efficiency of the drive system 10, which has a maximum value of 1.0 when an entirety of the drive force is mechanically transmitted from the first planetary gear set 14 and second planetary gear set 16 to the output gear 30, without transmission of an electric energy through the electric path.

In FIG. 8, a one-dot chain line represents the transmission efficiency of the drive system 10 placed in the mode 3 (HV-1), while a solid line represents the transmission efficiency in the mode 4 (HV-2). As indicated in FIG. 8, the transmission efficiency of the drive system 10 in the mode 3 (HV-1) has a maximum value at a speed ratio value $\gamma 1$. At this speed ratio value $\gamma 1$, the operating speed of the first electric motor MG1 (rotating speed of the sun gear S1) is zero, and an amount of an electric energy transmitted through the electric path is zero during generation of the reaction force, so that the drive force is only mechanically transmitted from the engine 12 and the second electric motor MG2 to the output gear 30, at an operating point corresponding to the speed ratio value $\gamma 1$. This operating point at which the transmission efficiency is maximum while the amount of the electric energy transmitted through the electric path is zero will be hereinafter referred to as a "mechanical point (mechanical transmission point)". The speed ratio value $\gamma 1$ is lower than "1", that is, a speed ratio on an over drive side, and will be hereinafter referred to as a "first mechanical transmission speed ratio value $\gamma 1$". As indicated in FIG. 8, the transmission efficiency in the mode 3 gradually decreases with an increase of the speed ratio from the first mechanical transmission speed ratio value $\gamma 1$ toward the low-gear side, and abruptly decreases with a decrease of the speed ratio from the first mechanical transmission speed ratio value $\gamma 1$ toward the high-gear side.

In the mode 4 (HV-2) of the drive system 10, the gear ratios $\rho 1$ and $\rho 2$ of the first planetary gear set 14 and second planetary gear set 16 having the four rotary elements in the engaged state of the clutch CL are determined such that the operating speeds of the first electric motor MG1 and second electric motor MG2 are indicated at respective different positions along the horizontal axis of the collinear chart of FIG. 6, so that the transmission efficiency in the mode 4 has a maximum value at a mechanical point at a speed ratio value $\gamma 2$, as well as at the speed ratio value $\gamma 1$, as indicated in FIG. 8. Namely, in the mode 4, the rotating speed of the first electric motor MG1 is zero at the first mechanical transmission speed ratio value $\gamma 1$ at which the amount of the electric energy transmitted through the electric path is zero during generation of the reaction force by the first electric motor MG1, while the rotating speed of the second electric motor MG2 is zero at the speed ratio value $\gamma 2$ at which the amount of the electric energy transmitted through the electric path is zero during generation of the reaction force by the second electric motor MG2. The speed ratio value $\gamma 2$ will be hereinafter referred to as a "second mechanical transmission speed ratio value $\gamma 2$". This second mechanical transmission speed ratio value $\gamma 2$ is smaller than the first mechanical transmission speed ratio value $\gamma 1$. In the mode 4, the drive system 10 has the mechanical point located on the high-gear side of the mechanical point in the mode 3.

As indicated in FIG. 8, the transmission efficiency in the mode 4 more abruptly decreases with an increase of the speed ratio on a low-gear side of the first mechanical transmission speed ratio value $\gamma 1$, than the transmission efficiency in the mode 3. In a region of the speed ratio between the first mechanical transmission speed ratio value $\gamma 1$ and second mechanical transmission speed ratio value $\gamma 2$, the transmission efficiency in the mode 4 changes along a concave curve. In this region, the transmission efficiency in the mode 4 is almost equal to or higher than that in the mode 3. The transmission efficiency in the mode 4 decreases with a decrease of the speed ratio from the second mechanical transmission speed ratio value $\gamma 2$ toward the high-gear side, but is higher than that in the mode 3. That is, the drive system placed in the mode 4 has not only the first mechanical transmission speed ratio value $\gamma 1$, but also the second mechanical transmission speed ratio value $\gamma 2$ on the high-gear side of the first mechanical transmission speed ratio value $\gamma 1$, so that the transmission efficiency of the drive system can be improved in high-gear positions having comparatively low speed ratio values. Thus, a fuel efficiency during running with relatively high speed is improved due to improvement of the transmission efficiency.

As described above referring to FIG. 8, the transmission efficiency of the drive system 10 during a hybrid running of the vehicle with an operation of the engine 12 used as the vehicle drive power source and operations of the first and second electric motors MG1 and MG2 as needed to generate a vehicle drive force and/or an electric energy can be improved by adequately switching the vehicle drive mode between the mode 3 (HV-1) and mode 4 (HV-2). For instance, the mode 3 is established in low-gear positions having speed ratio values lower than the first mechanical transmission speed ratio value $\gamma 1$, while the mode 4 is established in high-gear positions having speed ratio values higher than the first mechanical transmission speed ratio value $\gamma 1$, so that the transmission efficiency can be improved over a wide range of the speed ratio covering the low-gear region and the high-gear region.

Figure 7:
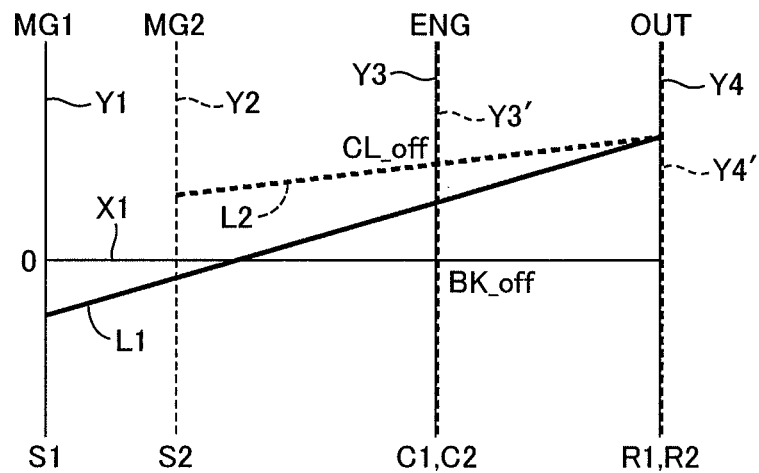
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (drive mode 5) of the drive system 10, which is preferably the hybrid drive mode in which the engine 12 is operated as the vehicle drive power source while the first electric motor MG1 and second electric motor MG2 are operated as needed to generate a vehicle drive force and/or an electric energy. In this mode 5, the engine 12 and first electric motor MG1 may be operated to generate a vehicle drive force, with the second electric motor MG2 being disconnected from the drive line. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive line (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive line, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source while the first electric motor MG1 and second electric motor MG2 are operated as needed to generate a vehicle drive force and/or an electric energy, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 9:
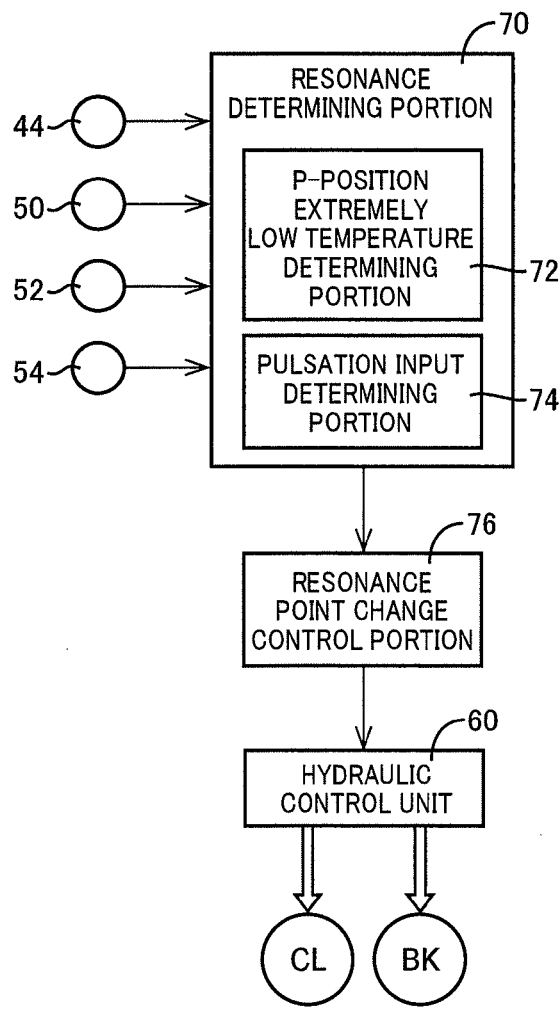
FIG. 9 is a functional block diagram for explaining major control functions of an electronic control device provided for the drive system of FIG. 1.
Figure 10:
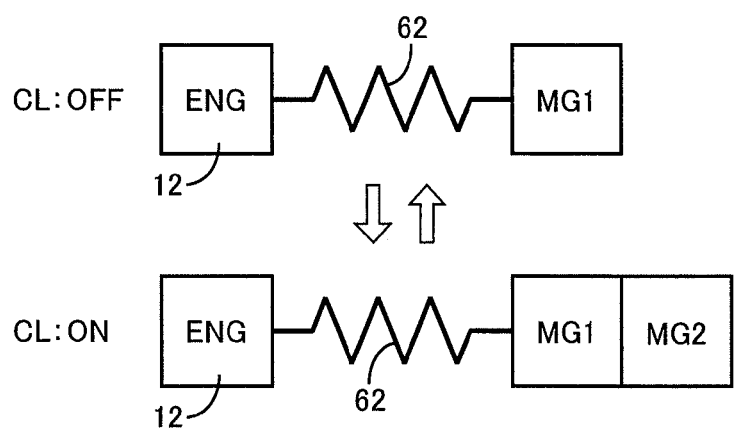
FIG. 10 is a view schematically illustrating different resonance frequency values of the power transmitting system in the drive system of FIG. 1, which correspond to the respective different operating states of the clutch.

FIG. 9 is the functional block diagram for explaining major control functions of the electronic control device 40. A resonance determining portion 70 shown in FIG. 9 is configured to determine whether or not a power transmitting system of the hybrid vehicle provided with the drive system 10 has a resonance. Namely, the resonance determining portion 70 detects or forecast generation of a resonance in the power transmitting system. The "power transmitting system" means a system so-called "a drive line" for power transmission from the vehicle drive power source to the drive wheels. In the hybrid vehicle provided with the drive system 10, the power transmitting system is a power transmission system which is provided in a power transmitting path from the vehicle drive power source in the form of the engine 12, first electric motor MG1 and second electric motor MG2 to the drive wheels in the form of tires 66 (shown in FIG. 12), and which includes the first planetary gear set 14, second planetary gear set 16, input shaft 28 and output gear 30, and a damper 62, a differential gear device 64, the tire 66, and a body 68 (which are shown in FIGS. 10 and 12).

As shown in FIG. 9, the resonance determining portion 70 includes a P-position extremely low temperature determining portion 72 and a pulsation input determining portion 74, which cooperate with each other to determine the resonance of the power transmitting system. The P-position extremely low temperature determining portion 72 is configured to determine that the power transmitting system has a resonance, if the presently selected operating position of the manually operable shifting device is the parking position while the temperature of the power transmitting system is equal to or lower than a predetermined threshold value. For instance, the P-position extremely low temperature determining portion 72 determines that the power transmitting system has a resonance, if the presently selected operating position $P_S$ of the manually operable shifting device, which is detected by the shift sensor 54, is the parking position while the oil temperature $T_{OIL}$ detected by the oil temperature sensor 52 is equal to or lower than a predetermined threshold value $T_{bo}$ (about −20° C., for instance). In other words, the P-position extremely low temperature determining portion 72 determines that there is a high degree of probability of generation of a vibration in the power transmitting system during starting of the engine 12, under a P-position extremely low temperature condition in which the manually operable shifting device provided on the hybrid vehicle is placed in the parking position while the oil temperature $T_{OIL}$ corresponding to the operating temperature of the power transmitting system is equal to or lower than the predetermined threshold value $T_{bo}$. Although the operating temperature of the power transmitting system is preferably represented by the temperature $T_{OIL}$ of the working oil supplied to various portions of the drive system 10, the operating temperature may be represented by the temperature of a cooling water of the engine 12, or the temperature of the battery connected to the first electric motor MG1 and second electric motor MG2, or alternatively, represented by an average of the working oil temperature, cooling water temperature for the engine and battery temperature.

The pulsation input determining portion 74 is configured to determine where the power transmitting system has a resonance, on the basis of the vehicle running speed V and the operating speed $N_E$ of the engine 12, and according to a predetermined relationship. For instance, the pulsation input determining portion 74 calculates a frequency of a pulsation (of an input torque) received from the roadway surface on which the vehicle is running (from the drive wheels), and determines that the pulsation received by the power transmitting system has been detected or forecasted, if the calculated frequency of the pulsation is substantially coincident with a resonance frequency of the power transmitting system, that is, falls within a predetermined range (band) of frequency a center point of which is equal to the resonance frequency. The resonance frequency of the power transmitting system is determined by inertial values of various portions of the drive system 10, and by the operating states of the clutch CL and brake BK, as described below. That is, the resonance frequency values of the drive system 10 which correspond to the different combinations of the operating states of the clutch CL and brake BK are obtained by experimentation and stored in a memory. The pulsation input determining portion 74 determines whether or not the frequency of the pulsation received from the roadway surface, which is calculated on the basis of the vehicle running speed V and the engine speed $N_E$, is substantially coincident with the resonance frequency value of the drive system 10 corresponding to the present combination of the operating states of the clutch CL and brake BK. If an affirmative determination is obtained, the pulsation input determining portion 74 determines that the input of the pulsation into the power transmitting system 10 has been detected or forecasted.

In the drive system 10 according to the present embodiment wherein the internal combustion engine in the form of the engine 12 is provided as a vehicle drive power source, a vibration damping torsional damper is provided between the engine 12 and the transaxles. The power transmitting system (drive line) including the torsional damper has a specific resonance frequency determined by its specific constructional arrangement. In the prior art, the power transmitting system is subjected to a large torque, due to boosting of the pulsation which is received by the transaxles from the roadway surface, and the frequency of which is coincident with the resonance frequency of the power transmitting system including the torsional damper. Accordingly, the durability of the input shaft and other members is adversely influenced. To eliminate this problem, the prior art power transmitting system is configured to provide the torsional damper with a torque limiter for preventing an input side section including the input shaft, from receiving a torque exceeding a predetermined upper limit, or to increase a size of the input shaft (the radial size of the input shaft) in order to increase the strength of the input side section. However, this prior art solution is contrary to the requirement for reduction of the size and weight of the power transmitting system, and results in another problem of an increased cost of manufacture of the power transmitting system.

FIG. 10 is the view schematically illustrating different resonance frequency values of the power transmitting system in the above-descried drive system 10, which correspond to the respective different operating states of the clutch CL. FIG. 11 is the view for explaining different characteristics of the power transmitting system (resonance frequency characteristics) corresponding to the respective different operating states of the clutch CL. In FIG. 11, a solid line represents the characteristic in the released state of the clutch CL, while a broken line represents the characteristic in the engaged state of the clutch CL. In the drive system 10, its resonance point (resonance frequency) changes depending upon whether the clutch CL is placed in the engaged state or the released state, while the brake BK is placed in the released state. Namely, the second electric motor MG2 is not connected to the power transmitting system between the engine 12 and first electric motor MG1, in the released state of the clutch CL, as indicated in an upper part of FIG. 10. When the clutch CL is switched from the released state to the engaged state, the second electric motor MG2 is connected to the power transmitting system between the engine. 12 and first electric motor MG1, as indicated in a lower part of FIG. 10. Accordingly, the components such as the rotor 24 of the second electric motor MG2 is added to the power transmitting system, so that the resonance point of the power transmitting system is changed as a result of a change of the characteristic relating to the inertia (inertia balance), as indicated in FIG. 11. In particular, a resonance point relating to an arrangement around the damper 62 (damper main) disposed between the engine 12 and the first electric motor MG1 is changed as a result of switching of the operating state of the clutch CL, as indicated in FIG. 10.

Figure 13:
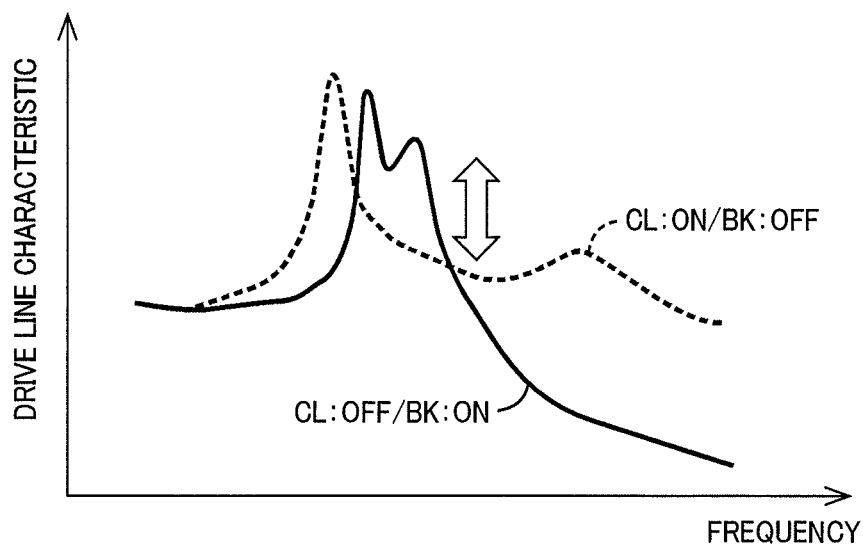
FIG. 13 is a view for explaining different characteristics of the power transmitting system (resonance frequency characteristics) in the drive system of FIG. 1, which correspond to respective different combinations of the operating states of the clutch and brake.

FIG. 12 is the view schematically illustrating different resonance frequency values of the power transmitting system in the drive system 10, which correspond to the respective different operating states of at least one of the clutch CL and brake BK. FIG. 13 is the view for explaining different characteristics of the power transmitting system (resonance frequency characteristics) which correspond to respective different combinations of the operating states of the clutch CL and brake BK. In FIG. 13, a solid line represents the characteristic in the released state of the clutch CL and in the engaged state of the brake BK, while a broken line represents the characteristic in the engaged state of the clutch CL and in the released state of the brake BK. As indicated in FIGS. 12 and 13, the resonance point (resonance frequency) in the drive system 10 changes as a result of switching of the operating state of the brake BK, in addition to or in place of switching of the operating state of the clutch CL. Namely, the second electric motor MG2 is not connected to the power transmitting system between the engine 12 and the first electric motor MG1, in the released state of the clutch CL and in the engaged state of the brake BK, that is, when the mode 3 (HV-1) indicated in FIG. 3 is established, as indicated in an upper part of FIG. 12. The second electric motor MG2 is connected to an output-side power transmitting system including the differential gear device 64, tire 66 and body 68, through the second planetary gear set 16 and the output gear 30. In the engaged state of the clutch CL and in the released state of the brake BK, that is, when the mode 4 (HV-2) indicated in FIG. 3 is established, on the other hand, the second electric motor MG2 is connected to the power transmitting system between the engine 12 and the first electric motor MG1, as indicated in a lower part of FIG. 12. Namely, the second electric motor MG2 is connected to an input-side power transmitting system. Accordingly, the resonance point of the power transmitting system is changed as a result of a change of the characteristic relating to the inertia (inertia balance), as indicated in FIG. 13.

A resonance point change control portion 76 shown in FIG. 9 is configured to implement a control for changing the resonance point in the power transmitting system, when the generation of resonance in the power transmitting system has been detected or forecasted by the resonance determining portion 70. As described by reference to FIGS. 10-13, the resonance frequency (resonance point) of the power transmitting system is changed by switching the operating state of at least one of the clutch CL and brake BK in the drive system 10. Accordingly, and described more specifically, the resonance point change control portion 76 implements the control for changing the resonance point in the power transmitting system, by switching the operating state of at least one of the clutch CL and brake BK, through the hydraulic control unit 60. That is, the operating state of at least one of the clutch CL and brake BK is preferably switched when the presently selected position of the manually operable shifting device is the parking position while the temperature of the power transmitting system is equal to or lower than the predetermined threshold value $T_{bo}$. Further, the operating state of at least one of the clutch CL and brake BK is preferably switched when the input of the pulsation corresponding to the resonance frequency, to the power transmitting system, has been detected or forecasted on the basis of the vehicle running speed V and the engine speed $N_E$, and according to the predetermined relationship.

Generally, it is difficult to raise the operating speed of the engine 12 during starting of the engine 12 from a state in which the vehicle is stopped by a cranking operation with the first electric motor MG1, for example, while the temperature $T_{OIL}$ of the working fluid to be supplied to the various portions of the drive system 10 is extremely low, for instance, equal to or lower than the predetermined threshold $T_{bo}$ (e.g., −20° C.), so that the engine 12 suffers from a large degree of friction, and the battery output is lowered. If the battery output is increased to easily raise the operating speed of the engine 12 at the extremely low temperature, the required size, weight and cost of manufacture of the battery are undesirably increased, and ease of installation of the battery on the vehicle is deteriorated. For this reason, a hardware solution has been commonly employed to permit starting of the engine 12 at a relatively low cranking speed. This hardware solution leads to limitations in design (designing of the specifications) of the vehicle. The power transmitting system is subjected to an excessively large torque due to generation of a resonance, giving rise to a problem of deterioration of the durability of the power transmitting system, particularly where the resonance point of the power transmitting system while the vehicle is stationary with the manually operable shifting device being placed in the parking position is coincident with the frequency of pulsation due to a rotary motion of the engine 12 (during its starting) at an extremely low temperature of the power transmitting system, that is, coincident with a frequency corresponding to the first-order component of explosion.

Figure 14:
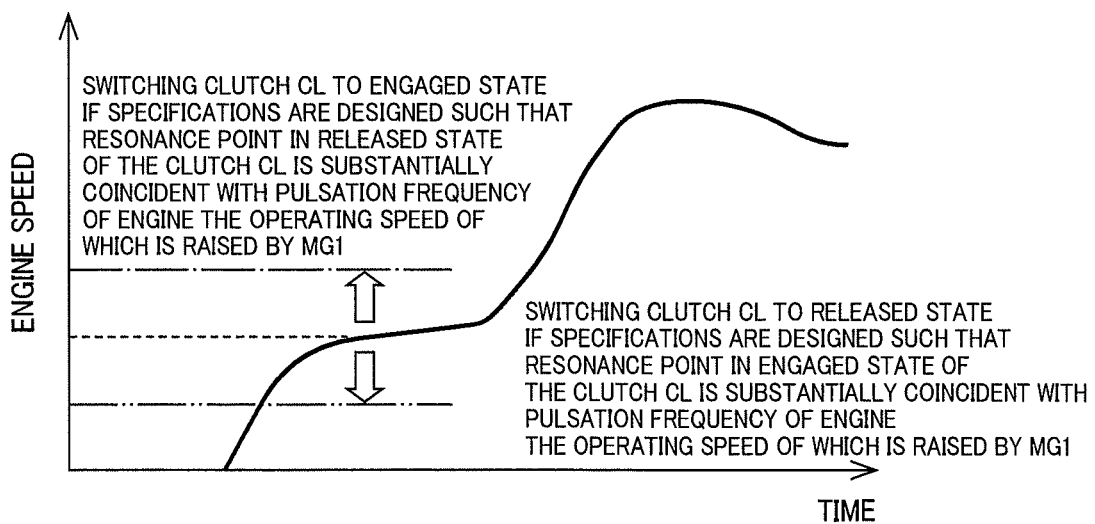
FIG. 14 is a view for explaining a resonance point change control implemented by the electronic control device provided for the drive system of FIG. 1, during starting of an engine.

To solve the problem, the resonance point change control portion 76 implements the control to change the resonance point of the power transmitting system, by switching the operating state of at least one of the clutch CL and brake BK, under the P-position extremely low temperature condition in which the manually operable shifting device is placed in the parking position while the temperature of the power transmitting system is equal to or lower than the predetermined threshold value $T_{bo}$. FIG. 14 is the view for explaining the resonance point change control implemented by the resonance point change control portion 76 during starting of the engine 12, the view indicating a change of the engine speed $N_E$ during starting of the engine 12 at the extremely low temperature. A broken line indicates the engine speed value corresponding to the resonance point of the power transmitting system at the extremely low temperature when the clutch CL is placed in the released state. If the specifications are designed such that the resonance point in the released state of the clutch CL is substantially coincident with the pulsation frequency (first-order component of explosion) of the engine 12 the operating speed of which is raised by the first electric motor MG1, the resonance frequency of the power transmitting system is changed to a value indicated by a one-dot chain line, for example, by switching the clutch CL to the engaged state upon starting of the engine 12 at the extremely low temperature, so that the resonance of the power transmitting system can be avoided. The broken line also indicates the engine speed value corresponding to the resonance point of the power transmitting system at the extremely low temperature when the clutch CL is placed in the engaged state. If the specifications are designed such that the resonance point in the engaged state of the clutch CL is substantially coincident with the pulsation frequency (first-order component of explosion) of the engine 12 the operating speed of which is raised by the first electric motor MG1, the resonance frequency of the power transmitting system is changed to a value indicated by a two-dot chain line, by switching the clutch CL to the released state upon starting of the engine 12 at the extremely low temperature, so that the resonance of the power transmitting system can be avoided. Thus, the resonance point change control portion 76 is configured to switch the operating state of at least one of the clutch CL and brake BK, making it possible to adequately prevent the generation of resonance during starting of the engine 12.

During running of the vehicle on a wavy roadway surface, the frequency of pulsation input to the vehicle from the roadway surface (wavy surface) is determined by a pitch of the waviness of the roadway surface, the vehicle running speed V, etc. Where the frequency of the pulsation input from the wavy surface is substantially coincident with the resonance frequency in the power transmitting system, the power transmitting system is subjected to an excessively large torque due to generation of a resonance, giving rise to the problem of deterioration of the durability of the power transmitting system. To solve this problem, the resonance point change control portion 76 implements the control to change the resonance point of the power transmitting system, by switching the operating state of at least one of the clutch CL and brake BK, if the input to the power transmitting system, of the pulsation the frequency of which corresponds to the resonance frequency (falls in the predetermined band of frequency a center point of which is equal to the resonance frequency), has been detected or forecasted on the basis of the vehicle running speed V and the engine speed $N_E$, and according to the predetermined relationship. Preferably, the resonance point change control portion 76 calculates the frequency of the pulsation input from the roadway surface, according to a predetermined relationship and on the basis of the engine speed $N_E$ detected by the engine speed sensor 44, the MG1 speed $N_{MG1}$ detected by the MG1 speed sensor 46, the MG2 speed $N_{MG2}$ detected by the MG2 speed sensor 48, the vehicle running speed V corresponding to the output speed $N_{OUT}$ detected by the output speed sensor 50, the required vehicle drive force corresponding to the accelerator pedal operation amount $A_{CC}$ detected by the accelerator pedal operation amount sensor 42, etc. If the calculated frequency of the input pulsation is determined to be substantially coincident with the resonance frequency of the drive system 10 which corresponds to the presently selected operating states of the clutch CL and brake BK, the resonance point change control portion 76 switches the operating state of at least one of the clutch CL and brake BK. This resonance point change control to change the resonance point of the power transmitting system is implemented when it is determined that the vehicle is running on a wavy roadway surface, with generation of a resonance, or when it is determined that the vehicle is running with a high probability of generation of a resonance. The resonance point change control makes it possible to adequately prevent the generation of a resonance.

Figure 15:
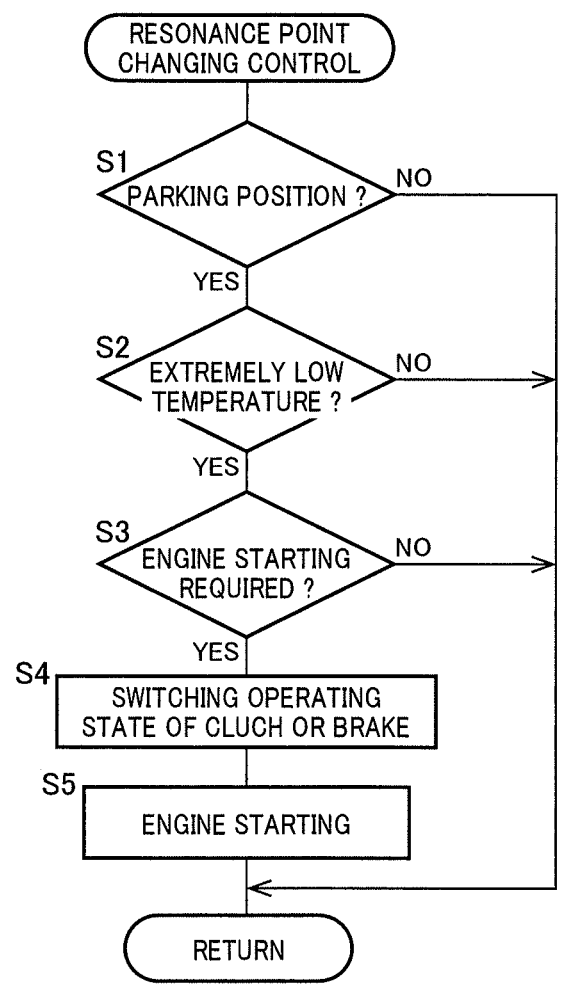
FIG. 15 is a flow chart for explaining a major portion of the resonance point change control implemented by the electronic control device provided for the drive system of FIG. 1.

FIG. 15 is the flow chart for explaining a major portion of the resonance point change control implemented by the electronic control device 40. The resonance point change control is repeatedly implemented with a predetermined cycle time.

The resonance point change control is initiated with step S1 (hereinafter "step" being omitted), to determine whether the operating position $P_S$ of the manually operable shifting device detected by the shift position sensor 54 is the parking position, or not. If a negative determination is obtained in S1, the present control routine is terminated. If an affirmative determination is obtained in S1, the control flow goes to S2 to determine whether the temperature of the drive system 10 is extremely low, namely, whether the temperature $T_{OIL}$ of the working oil supplied to the various portions of the drive system 10 is equal to or lower than the predetermined threshold value $T_{bo}$ (e.g., −20° C.), or not. If a negative determination is obtained in S2, the present control routine is terminated. If an affirmative determination is obtained in S2, the control flow goes to S3 to determine whether starting of the engine 12 is required, or not. If a negative determination is obtained in S3, the present control routine is terminated. If an affirmative determination is obtained in S3, the control flow goes to S4 in which the operating state of at least one of the clutch CL and brake BK is switched through the hydraulic control unit 60. Then, the control flow goes to S5 in which the operating speed of the engine 12 is raised by the first electric motor MG1, for example, and the engine 12 is started under the control of the engine control device 56. The control routine is then terminated. In the present control routine, S1-S3 correspond to the resonance determining portion 70 and P-position extremely low temperature determining portion 72, and S4 corresponds to the resonance point change control portion 76.

Figure 16:
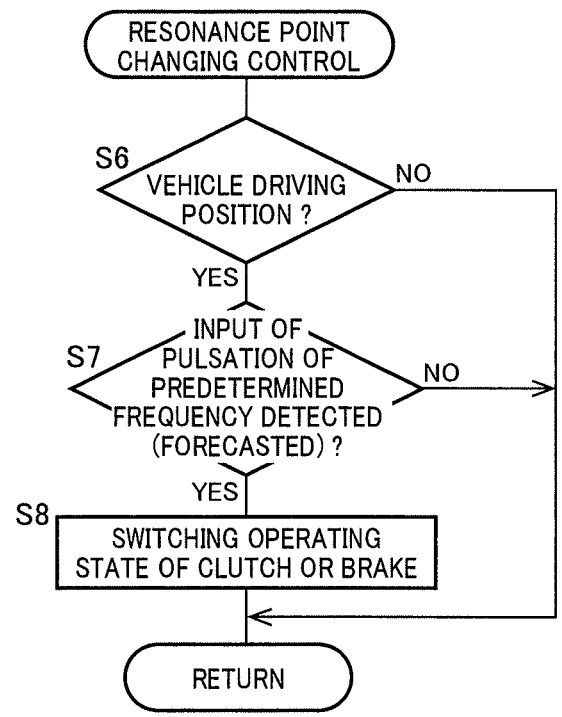
FIG. 16 is a flow chart for explaining a major portion of another resonance point change control implemented by the electronic control device provided for the drive system of FIG. 1.

FIG. 16 is the flow chart for explaining a major portion of another resonance point change control implemented by the electronic control device 40. The resonance point change control is repeatedly implemented with a predetermined cycle time.

The resonance point change control is initiated with step S6 to determine whether the operating position $P_S$ of the manually operable shifting device detected by the shift position sensor 54 is any one of vehicle driving positions such as positions D, S and R. If a negative determination is obtained in S6, the present control routine is terminated. If an affirmative determination is obtained in S6, the control flow goes to S7 to determine whether the input to the power transmitting system, of a pulsation having a predetermined frequency which falls in a predetermined band of frequency a center point of which is equal to the resonance frequency, has been detected or forecasted on the basis of the vehicle running speed V and the engine speed $N_E$, and according to the predetermined relationship. If a negative determination is obtained in S7, the present control routine is terminated. If an affirmative determination is obtained in S7, the control flow goes to S8 in which the operating state of at least one of the clutch CL and brake BK is switched through the hydraulic control unit 60. The control routine is then terminated. In the present control routine, S6 and S7 correspond to the resonance determining portion 70 and pulsation input determining portion 74, and S8 corresponds to the resonance point change control portion 76.

Other preferred embodiments of the present invention will be described in detail by reference to the drawings. In the following description, the same reference signs will be used to identify the same elements in the different embodiments, which will not be described redundantly.

Second Embodiment

Figure 17:
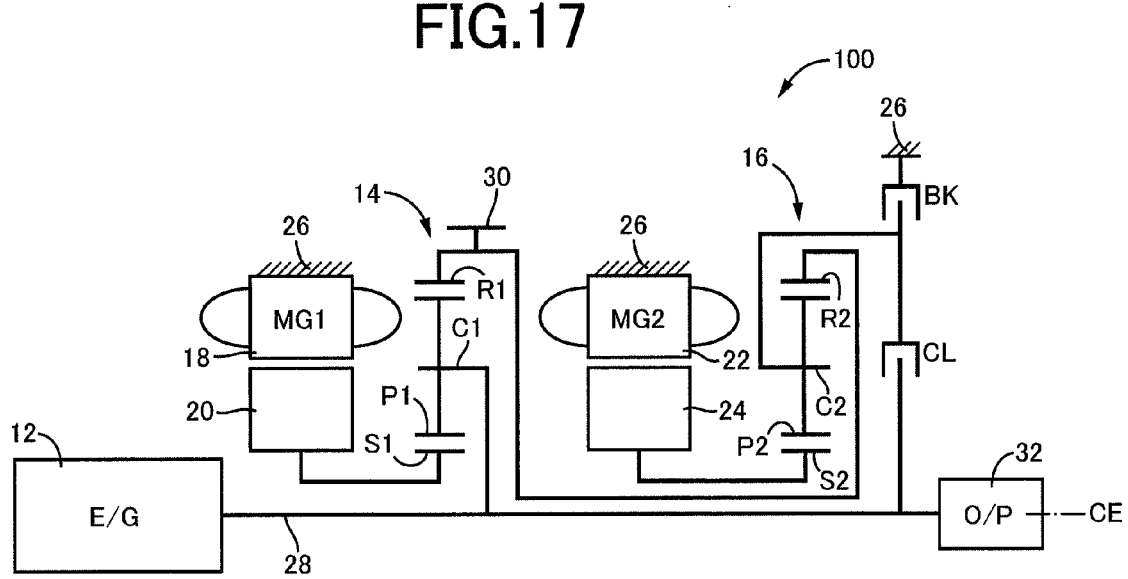
FIG. 17 is a schematic view for explaining an arrangement of a hybrid vehicle drive system according to another preferred embodiment of this invention.

FIG. 17 is the schematic view for explaining an arrangement of a hybrid vehicle drive system 100 (hereinafter referred to simply as a "drive system 100") according to another preferred embodiment of this invention. In this drive system 100 shown in FIG. 17, the second planetary gear set 16, clutch CL and brake BK are disposed on one side of the first planetary gear set 14 remote from the engine 12, such that the second electric motor MG2 is interposed between the first planetary gear set 14, and the second planetary gear set 16, clutch CL and brake BK, in the axial direction of the center axis CE. Preferably, the clutch CL and brake BK are disposed at substantially the same position in the axial direction of the center axis CE. That is, the drive system 100 is configured such that the first electric motor MG1, first planetary gear set 14, second electric motor MG2, second planetary gear set 16, clutch CL, and brake BK are disposed coaxially with each other, in the order of description from the side of the engine 12, in the axial direction of the center axis CE. The hybrid vehicle drive control device according to the present invention is equally applicable to the present drive system 100 configured as described above.

Third Embodiment

Figure 18:
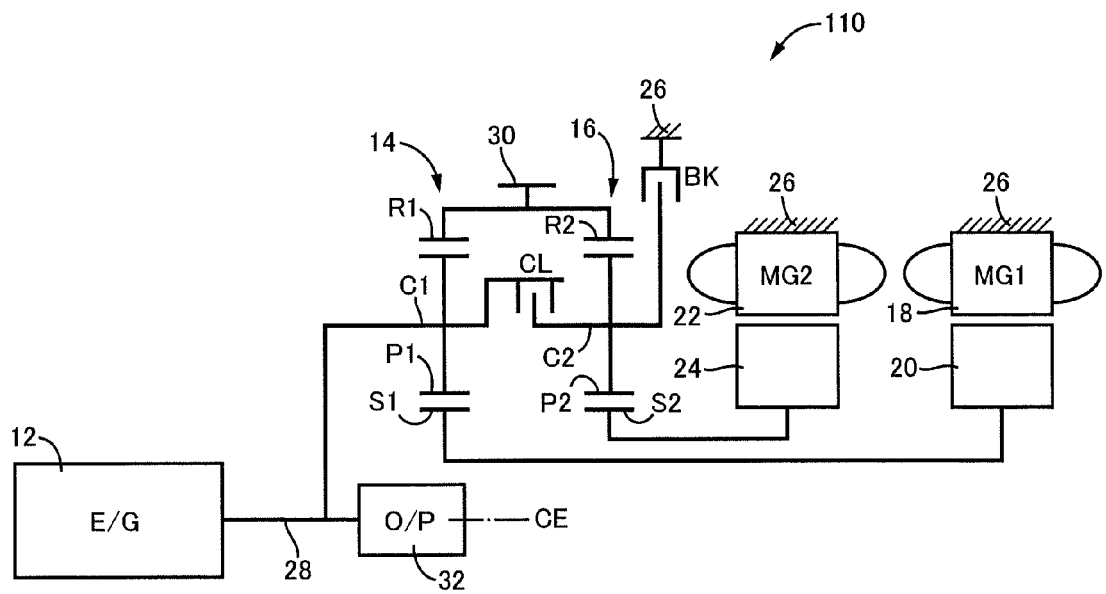
FIG. 18 is a schematic view for explaining an arrangement of a hybrid vehicle drive system according to a further preferred embodiment of this invention.

FIG. 18 is a schematic view for explaining an arrangement of a hybrid vehicle drive system 110 (hereinafter referred to simply as a "drive system 110") according to a further preferred embodiment of this invention. In this drive system 110 shown in FIG. 18, the first planetary gear set 14, clutch CL, second planetary gear set 16 and brake BK which constitute a mechanical system are disposed on the side of the engine 12, while the first electric motor MG1 and second electric motor MG2 which constitute an electric system are disposed on one side of the mechanical system remote from the engine 12. That is, the drive system 110 is configured such that the first planetary gear set 14, clutch CL, second planetary gear set 16, brake BK, second electric motor MG2, and first electric motor MG1 are disposed coaxially with each other, in the order of description from the side of the engine 12, in the axial direction of the center axis CE. The hybrid vehicle drive control device according to the present invention is equally applicable to the present drive system 110 configured as described above.

Fourth Embodiment

Figure 19:
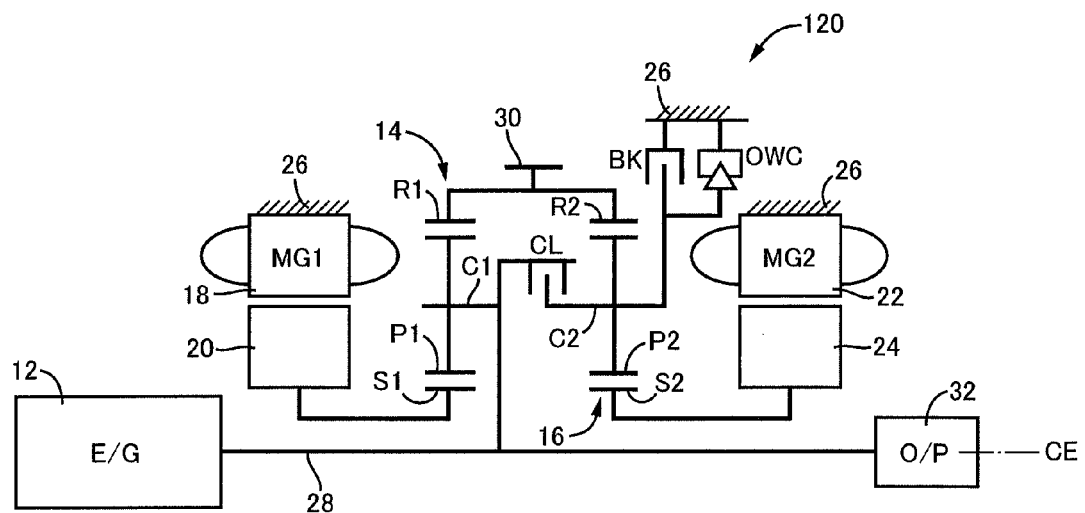
FIG. 19 is a schematic view for explaining an arrangement of a hybrid vehicle drive system according to a still further preferred embodiment of this invention.

FIG. 19 is the schematic view for explaining an arrangement of a hybrid vehicle drive system 120 (hereinafter referred to simply as a "drive system 120") according to a still further preferred embodiment of this invention. In this drive system 120 shown in FIG. 19, a one-way clutch OWC is disposed in parallel with the brake BK, between the carrier C2 of the second planetary gear set 16 and the stationary member in the form of the above-indicated housing 26. The one-way clutch OWC permits a rotary motion of the carrier C2 in one of opposite directions relative to the housing 26, and inhibits a rotary motion of the carrier C2 in the other direction. Preferably, this one-way clutch OWC permits the rotary motion of the carrier C2 in the positive or forward direction relative to the housing 26, and inhibits the rotary motion of the carrier C2 in the negative or reverse direction. Namely, in a drive state where the carrier C2 is rotated in the negative direction, that is, the second electric motor MG2 is operated to generate a negative torque, for example, the modes 1-3 can be established without the engaging action of the brake BK. The hybrid vehicle drive control device according to the present invention is equally applicable to the present drive system 120 configured as described above.

Fifth Embodiment

Figure 20:
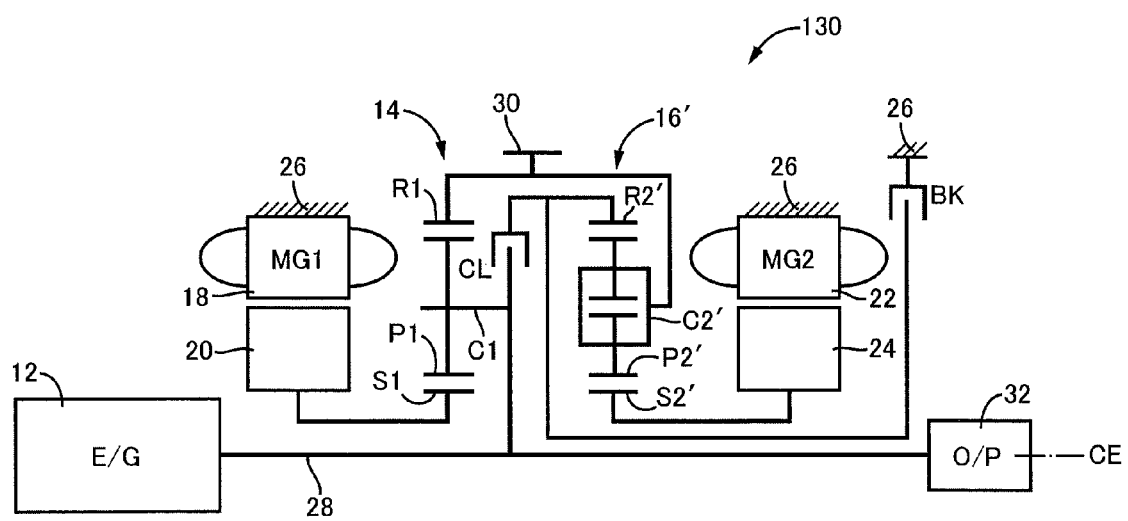
FIG. 20 is a schematic view for explaining an arrangement of a hybrid vehicle drive system according to a yet further preferred embodiment of this invention.

FIG. 20 is the schematic view for explaining an arrangement of a hybrid vehicle drive system 130 (hereinafter referred to simply as a "drive system 130") according to a yet further preferred embodiment of this invention. This drive system 130 shown in FIG. 20 is provided with a second differential mechanism in the form of a double-pinion type second planetary gear set 16' disposed on the center axis CE, in place of the single-pinion type second planetary gear set 16. This second planetary gear set 16' is provided with rotary elements (elements) consisting of: a first rotary element in the form of a sun gear S2'; a second rotary element in the form of a carrier C2' supporting a plurality of pinion gears P2' meshing each other such that each pinion gear P2' is rotatable about its axis and the axis of the planetary gear set; and a third rotary element in the form of a ring gear R2' meshing with the sun gear S2' through the pinion gears P2'.

The ring gear R1 of the first planetary gear set 14 is connected to the output rotary member in the form of the output gear 30, and to the carrier C2 of the second planetary gear set 16'. The sun gear S2' of the second planetary gear set 16' is connected to the rotor 24 of the second electric motor MG2. Between the carrier C1 of the first planetary gear set 14 and the ring gear R2' of the second planetary gear set 16', there is disposed the clutch CL which is configured to selectively couple these carrier C1 and ring gear R2' to each other (to selectively connect the carrier C1 and ring gear R2' to each other or disconnect the carrier C1 and ring gear R2' from each other). Between the ring gear R2' of the second planetary gear set 16' and the stationary member in the form of the housing 26, there is disposed the brake BK which is configured to selectively couple (fix) the ring gear R2' to the housing 26.

As shown in FIG. 20, the drive system 130 is configured such that the first planetary gear set 14 and second planetary gear set 16' are disposed coaxially with the input shaft 28, and opposed to each other in the axial direction of the center axis CE. Namely, the first planetary gear set 14 is disposed on one side of the second planetary gear set 16' on the side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16' which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16' are interposed between the first electric motor MG1 and second electric motor MG2. That is, the drive system 130 is configured such that the first electric motor MG1, first planetary gear set 14, clutch CL, second planetary gear set 16', second electric motor MG2, and brake BK are disposed coaxially with each other, in the order of description from the side of the engine 12, in the axial direction of the center axis CE. The hybrid vehicle drive control device according to the present invention is equally applicable to the present drive system 130 configured as described above.

Sixth Embodiment

Figure 21:
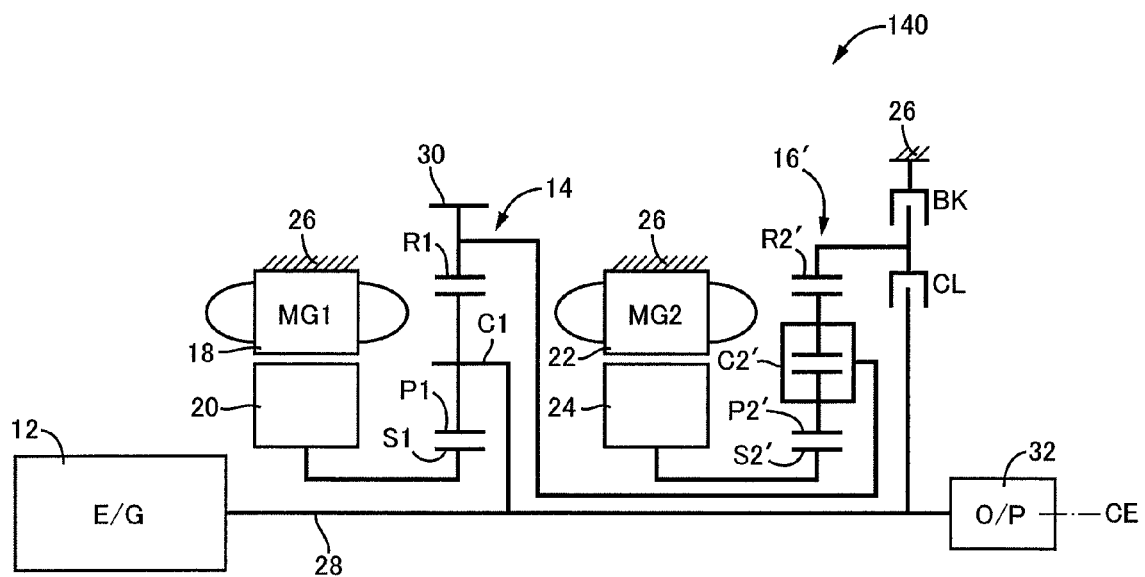
FIG. 21 is a schematic view for explaining an arrangement of a hybrid vehicle drive system according to still another preferred embodiment of this invention.

FIG. 21 is the schematic view for explaining an arrangement of a hybrid vehicle drive system 140 (hereinafter referred to simply as a "drive system 140" according to still another preferred embodiment of this invention. In this drive system 140 shown in FIG. 21, the second planetary gear set 16', clutch CL and brake BK are disposed on one side of the first planetary gear set 14 remote from the engine 12, such that the second electric motor MG2 is interposed between the first planetary gear set 14, and the second planetary gear set 16', clutch CL and brake BK, in the axial direction of the center axis CE. Preferably, the clutch CL and brake BK are disposed at substantially the same position in the axial direction of the center axis CE. That is, the drive system 140 is configured such that the first electric motor MG1, first planetary gear set 14, second electric motor MG2, second planetary gear set 16', clutch CL, and brake BK are disposed coaxially with each other, in the order of description from the side of the engine 12, in the axial direction of the center axis CE. The hybrid vehicle drive control device according to the present invention is equally applicable to the present drive system 140 configured as described above.

Seventh Embodiment

Figure 22:
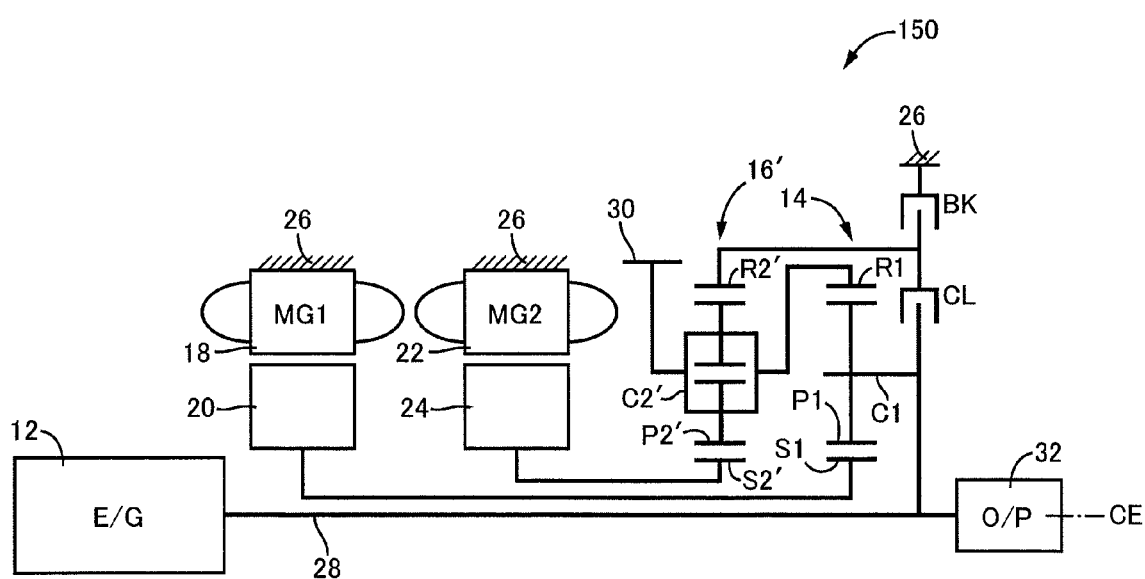
FIG. 22 is a schematic view for explaining an arrangement of a hybrid vehicle drive system according to yet another preferred embodiment of this invention.

FIG. 22 is the schematic view for explaining an arrangement of a hybrid vehicle drive system 150 (hereinafter referred to simply as a "drive system 150") according to yet another preferred embodiment of this invention. In this drive system 150 shown in FIG. 22, the first electric motor MG1 and second electric motor MG2 which constitute an electric system are disposed on the side of the engine 12, while the second planetary gear set 16', first planetary gear set 14, clutch CL, and brake BK which constitute a mechanical system are disposed on one side of the electric system remote from the engine 12. Preferably, the clutch CL and the brake BK are positioned substantially same level with regard to an axial direction of the center axis CE. That is, the drive system 150 is configured such that the first electric motor MG1, second electric motor MG2, second planetary gear set 16', first planetary gear set 14, clutch CL, and brake BK are disposed coaxially with each other, in the order of description from the side of the engine 12, in the axial direction of the center axis CE. The hybrid vehicle drive control device according to the present invention is equally applicable to the present drive system 150 configured as described above.

The present embodiment described above is provided with: the first differential mechanism in the form of the first planetary gear set 14 having the first rotary element in the form of the sun gear S1 connected to the first electric motor MG1, the second rotary element in the form of the carrier C1 connected to the engine 12, and the third rotary element in the form of the ring gear R1 connected to the output rotary member in the form of the output gear 30; the second differential mechanism in the form of the second planetary gear set 16 (16') having the first rotary member in the form of the sun gear S2 (S2') connected to the second electric motor MG2, the second rotary element in the form of the carrier C2 (C2'), and the third rotary element in the form of the ring gear R2 (R2'), one of the carrier C2 (C2') and the ring gear R2 (R2') being connected to the ring gear R1 of the first planetary gear set 14; the clutch CL configured to selectively couple the carrier C1 of the first planetary gear set 14, and the other of the carrier C2 (C2') and the ring gear R2 (R2') which is not connected to the ring gear R1, to each other; and the brake BK configured to selectively couple the other of the carrier C2 (C2') and the ring gear R2 (R2') which is not connected to the ring gear R1, to the stationary member in the form of the housing 26. The operating state of at least one of the clutch CL and brake BK is switched when the resonance of the power transmitting system in the hybrid vehicle has been detected or forecasted. Thus, in the event of detection or forecasting of the resonance of the power transmitting system, the resonance point of the power transmitting system is changed by changing the inertia balance of the power transmitting system, so that the generation of a resonance can be adequately prevented. Namely, the present embodiment provides the drive control device in the form of the electronic control device 40 for the hybrid vehicle, which permits reduction of vibrations of the power transmitting system of the hybrid vehicle.

The operating state of at least one of the clutch CL and brake BK is switched when the presently selected position of the manually operable shifting device of the hybrid vehicle is the parking position while the temperature $T_{OIL}$ of the working oil corresponding to the temperature of the power transmitting system is equal to or lower than a predetermined threshold value $T_{bo}$. Accordingly, the generation of a resonance of the power transmitting system can be detected or forecasted in a practical manner, and can be adequately prevented.

The operating state of the at least one of the clutch CL and brake BK is switched when the input of a pulsation to the power transmitting system has been detected or forecasted on the basis of the vehicle running speed V and the engine speed $N_E$. Accordingly, the generation of a resonance of the power transmitting system can be detected or forecasted in a practical manner, and can be adequately prevented.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS 10, 100, 110, 120, 130, 140, 150: Hybrid vehicle drive system
12: Engine 14: First planetary gear set (First differential mechanism)
16: Second planetary gear set (Second differential mechanism)
18, 22: Stator 20, 24: Rotor 26: Housing (Stationary member)
28: Input shaft 30: Output gear (Output rotary member)
32: Oil pump 40: Electronic control device (Drive control device)

42: Accelerator pedal operation amount sensor 44: Engine speed sensor
46: MG1 speed sensor 48: MG2 speed sensor 50: Output speed sensor
52: Oil temperature sensor 54: Shift position sensor
56: Engine control device 58: Inverter 60: Hydraulic control unit
62: Damper 64: Differential gear device 66: Tire 68: Body
70: Resonance determining portion
72: P-position extremely low temperature determining portion
74: Pulsation input determining portion
76: Resonance point change control portion
BK: Brake CL: Clutch
C1, C2, C2': Carrier (Second rotary element)
MG1: First electric motor MG2: Second electric motor
OWC: One-way clutch P1, P2, P2': Pinion gear
R1, R2, R2': Ring gear (Third rotary element)
S1, S2, S2': Sun gear (First rotary element)

The invention claimed is:

1. A drive control device for a hybrid vehicle provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element, and a third rotary element, one of the second rotary element and the third rotary element being connected to the third rotary element of said first differential mechanism; a clutch configured to selectively couple the second rotary element of said first differential mechanism, and the other of the second and third rotary elements of said second differential mechanism which is not connected to the third rotary element of said first differential mechanism, to each other; and a brake configured to selectively couple said other of the second and third rotary elements of said second differential mechanism which is not connected to the third rotary element of said first differential mechanism, to a stationary member, the drive control device comprising:
a resonance point change control portion configured to switch an operating state of at least one of said clutch and said brake when a resonance of a power transmitting system in said hybrid vehicle has been detected or forecasted, and
a resonance determining portion configured to determine whether a presently selected position of a manually operable shifting device in said hybrid vehicle is a parking position while a temperature of said power transmitting system of said hybrid vehicle is equal to or lower than a predetermined threshold value, and wherein said resonance point change control portion switches the operating state of the at least one of said clutch and brake when said resonance determining portion has determined that the presently selected position of the manually operable shifting device is said parking position while the temperature of the power transmitting system is equal to or lower than said predetermined threshold value.

* * * * *